United States Patent Office 3,083,610
Patented Apr. 2, 1963

3,083,610
METAL COATED PROPELLANT
Leslie E. Lancy, 533 Wampum St., Ellwood City, Pa.
Filed Apr. 27, 1959, Ser. No. 808,939
9 Claims. (Cl. 86—1)

This invention relates to a coated solid fuel propellant such as used for rocket motors, to an improved propellant construction, and particularly, to metal coating a propellant body.

Solid fuel propellants such as used for rocket motors are often in the form of a double-base propellant containing explosive material, such as nitrocellulose and nitroglycerine. These nitrate combinations contain sufficient oxygen in their structures to support combustion. A propellant of this type is cast or formed as a substantially solid body which is somewhat jelly-like pliable, or plastic in its nature, in that when formed as a cylinder and placed on its side, will tend to flatten, due to its weight. By way of example, reference is made to an article entitled "Small-Scale Facilities for Development of Double-Base Propellants" which appeared in the February 1956 issue of Chemical Engineering Progress, volume 52, No. 2, pages 79–F to 82–F.

This invention deals with what may be termed an inhibited propellant charge or one which has a material adhering to at least a portion of its surface to control or inhibit burning of such portion. Previous to my invention, materials employed for this purpose have been of organic, resinous or fibrous nature and may, for example, comprise cellulose acetate or ethyl cellulose; cellulose acetate is the more common of the two. Such materials are generally applied in the form of a tape or winding to the surface of the propellant body or shape, as by winding it thereabout. It also may be applied by casting the propellant body directly in a cellulose acetate beaker. A suitable solvent, such as acetone may be used as the adhesive.

An inhibited charge is usually of a so-called end-burning restricted or of an internal-burning restricted type. In the end-burning restricted type, the propellant is made in the form of a right circular cylinder with the cylindrical side surface and one end of the body inhibited, so that burning can only occur at the exposed end. In the internal-burning restricted type, the propellant is made in the form of a right circular cylinder with an internal perforation. The charge will have a restriction on its outer periphery and, in some cases on its ends, so that burning will occur from the internal perforation and will work radially-outwardly.

I have determined that coatings of an organic type have not been too satisfactory and are required in thicknesses of from about .050 inch to over about .30 inch. The thickness of the inhibited coating is dependent upon the burning time and the size of the propellant grain structure, and materials of this type, of necessity, have to be of a relatively heavy thickness to comply with requirements. Relatively thick coatings involve a loss in loading density (ratio of cross-sectional area of the propellant to internal cross-sectional area of the wall chamber of the rocket body within which it is placed). For example, if the propellant has a body of 20 inches in outside diameter, including an inhibitor thickness of 0.30 of an inch, and is to be inserted in a motor with a 20½ inch inside diameter, a loading density of about 89.4% is achieved (assuming no perforation in the propellant grain). On the other hand, with an inhibitor thickness of 0.03 of an inch, a loading density of 94.6% can be attained to provide a gain of 5.2% in loading density. The importance of a minimized thickness from this standpoint is thus obvious. An increase in loading density is extremely vital for larger missiles where every ounce of propellant weight is critical.

Aside from the factor of coating thickness of heretofore used materials, I have found that such materials, being relatively non-conductive of heat and non-reflective, are inefficient from the standpoint of quick heat transfer, such as I have found to be desirable in inhibitor coatings. The need is for a coating that will have improved characteristics, such as it can be effectively used as a relatively thinner coating. Even if, in some cases, it is to be provided with a supporting function (as in the form of a thicker coating), it will have other properties that provide a fuel propellant charge of improved characteristics. However, in applying coatings, I have determined that the nature of the body, itself, must be taken into consideration to avoid the attainment of a temperature above the burning temperature of the body in the application. Using a double propellant, as above mentioned, the temperature of the body should be kept below about 200 to 280° F. This, in itself, presents a further problem.

I have discovered that a metal or metallic type of inhibitor coating, if it can be applied successfully and without danger, will have characteristics that are needed, including a better inhibiting action, such as needed in providing an improved solid fuel propellant. In this connection, a metal having reflective properties or that can be applied in such a manner as to provide an outer reflective surface and that has a melting point above that of the softer metals, such as lead, cadmium and similar alloy metals, may be employed in this connection. Aluminum is a very desirable metal, both because of its high conductivity and essentially, because of its high reflectivity from the standpoint of heat. Silver and gold, as well as chromium, iron, nickel and their alloys also may be used. These materials not only have sufficiently high melting points, but also afford requisite mechanical strength, thermal resistance, chemical stability and resistance to plasticizer migration from the propellant body.

As to the important factor of loading density from the standpoint of larger bodies, I have found that I can attain a loading density closely approaching that which might be attained by bonding the propellant to the rocket motor wall which, in itself, is not practical from the standpoint of damage to such wall and the shortening of its operating life. Heretofore, metallic coatings for this purpose have been avoided by those skilled in the art.

It has thus been an object of my invention to devise a solution to the problem heretofore presented in the use of organic inhibitors or of coatings of resinous of fabric-like material such as heretofore utilized for propellant bodies employing so-called solid fuels;

Another object has been to provide an improved propellant construction for use in rocket motors;

Another object of my invention has been to determine the factors entering into the provision of a better inhibitor and to meet such factors in such a manner as to provide an improved product and one which will extend the field of utilization of so-called solid fuel propellants;

A further object has been to devise a metallic inhibited type of propellant body and to do so without damage to such body and without causing it to burn during application of the metal;

A still further object of my invention has been to devise procedure for producing an improved type of solid fuel propellant and of a type such that a metallic material may be practical for use as the inhibitor;

A still further object of my invention has been to provide an inhibitor coating of a metallic type for a solid fuel propellant, such that improved characteristics may be imparted to the product, particularly from the standpoint of heat reflective and conducting properties;

These and other objects will appear to those skilled in the art from my disclosure.

In the drawings exemplifying the invention, FIGURE 1 is an isometric side view of a solid fuel propellant product or article constructed in accordance with my invention;

FIGURE 1A is a view similar to FIGURE 1 showing a segmental type of product or article constructed in accordance with my invention;

FIGURE 2 is a slightly reduced broken-away side view in partial section showing the article or product of FIGURE 1 in position within a conventional rocket motor ready for firing;

Figure 3:
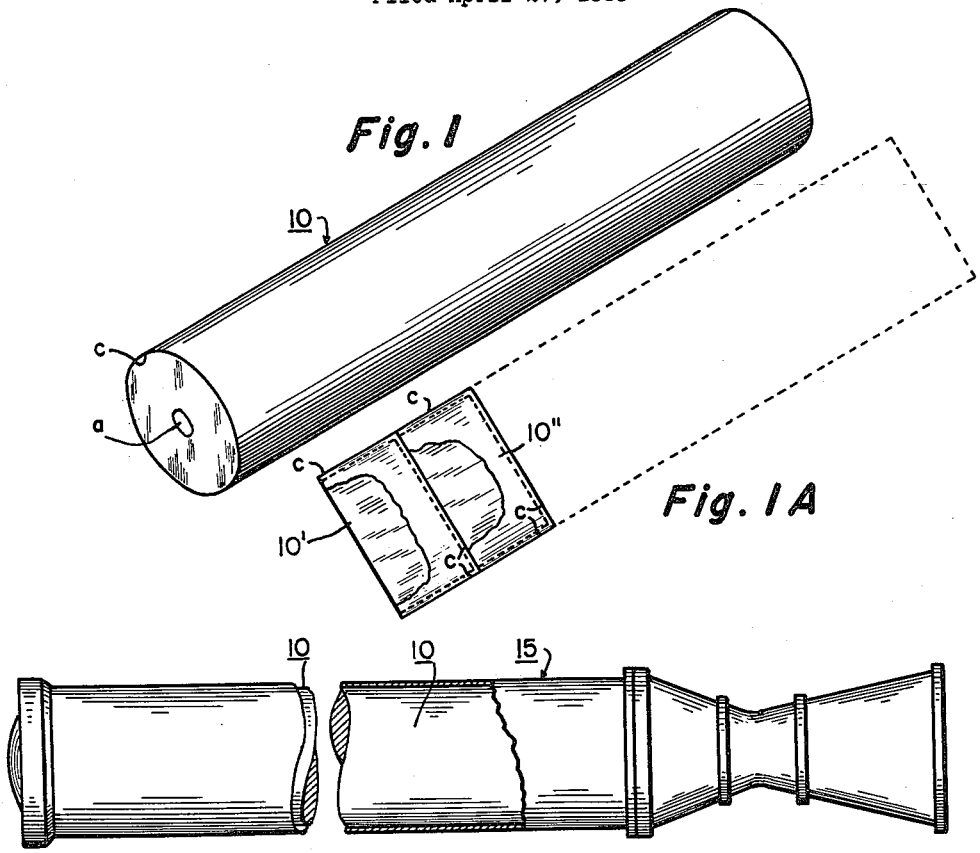
FIGURE 3 is a greatly enlarged fragmental end section illustrating an embodiment of my invention.

In accordance with my invention, I provide and apply a coating or inhibitor metal or alloy that, as applied, has a suitable oxidation resistance, reflectivity, and that may be employed to increase the loading density of the pay load carried by a missile. In applying a metallic coating, I have employed a vacuum process, involving the evacuation of air about the propellant body, as formed, and the application of a suitable metal heated above its boiling point so as to apply it in vaporized form to and crystallize it out on the cold surface of the propellant body. The metals mentioned can be employed in this connection, since the small, vaporized particles are applied (rather than a molten metal mass which would heat the propellant above 200° F). On the other hand, vaporized molecules (evaporated metal) hitting the cold surface immediately give up their heat as they are deposited, without appreciably raising the temperature of the propellant. Material such as aluminum, for example, will serve to inhibit the desired burning as to the propellant body, but at the same time, in the final action, will, itself, easily burn, but before this time, will reflect from the surface of the propellant upon which it is applied and, for a matter of a few seconds.

Thus, a metal is a much more effective and efficient type of inhibitor than a relatively non-conductive, organic material and can be applied as a relatively infinitesimal thickness to provide a coating whose particles are strongly molecularly bonded to each other and that securely adhere to the surface of the propellant body to which they are applied. For example, a thickness of basic composite coating (first layer of resin or lacquer and second layer of metal) of about .0005 of an inch has been found to be suitable. If an outer coating of lacquer or resin is used, then the same composite thickness may be used, making the metal about 10% of the total thickness, as before, and the lacquer 90%. In this connection, I prefer to make the first lacquer coating slightly thicker than the outer coating, for example, 60% of 90% as compared to 40% of 90%. On the other hand, a much heavier coating of all-organic material would be necessary, as previously pointed out. Also, wrapping or tapping is eliminated.

In practicing the vacuum applying procedure, the propellant body is placed in a closed container from which air is pumped out and into which the hot vaporized metal is introduced as a stream until a requisite thickness of coating is obtained. Exposed surface areas of the propellant body that are not to be coated may be temporarily covered with a suitable material such as paper. The heating is thus limited to the metal, itself, without appreciably heating or surface-vaporizing the propellant body.

I also seal the organics of the fuel body, since a vacuum tends to lower its boiling point, with a preliminary-applied organic material in the form of a lacquer of nitrocellulose (pay-load material). I also contemplate applying an outer coating of non-explosive organic material or lacquer to the metal coating to retain its bright finish. The first lacquer coating acts as a further heat barrier to the main body of the propellant in the metal-applying operation. The application is simplified from the standpoint that wrapping is eliminated. Where the inhibitor is to be applied internally to the cavity of a propellant body, the application can be effected to provide a fully adherent coating thereon.

The coating produced has improved characteristics and reduces possible powdering of the motor fuel, seals it against moisture due to vapor and fume, and insulates it from the rocket body when placed in position, and makes possible a reduction in the necessary wall thickness of the rocket body.

In propellant bodies where shape retention is of importance, I contemplate spraying on additional metal after the first or vacuum application, so as to build-up its wall strength. This second application of metal may be limited, if desired, to portions that are to be strengthened, such as to the inner wall of a bore or cavity of the propellant body. Since the metal body acts as a continuous surface binding about the body of the solid propellant material, it also has the function of aiding in retaining it in its cylindrical shape. Where the thickness of metal coating is to be built up for strength purposes, assuming, for example, that the initial coating is of aluminum, gold or silver, then a stronger material, such as nickel, chromium, iron or their alloys can be applied by a metallizing spray process, or by electroplating on the base coating.

In accordance with my invention, I may form a propellant body in a conventional manner, as by pouring a mixed mass of explosive material into a mold to shape it and provide an adherent, somewhat self-supporting, resinous body. If the propellant is to be of a so-called internal burning, restricted type, a cavity or bore is provided that may be open to the back end of the shape. Such cavity may now be given any desired shape or design needed for proper burning or control of burning of the explosive material.

At the present time, burning is controlled, for the most part, by varying the shape of such bore, but difficulty has been encountered from the standpoint that the area may not be sufficient for the desired control, and essentially, from the standpoint that the desired type of cavity may cause the shape to collapse internally before it is to be used. In accordance with my invention, the internal wall of such cavity is, in effect, reinforced so that any desired internal configuration can be provided for control purposes. In addition, the supporting coating, itself, may be employed to further the desired type of control or burning inhibition.

Next, in order to prevent exudation of the body from its exposed surface portions during a subsequent vacuum vaporizing operation for applying a metal coating and to, in effect, provide a smooth exposed surface in which interstices, cavities, etc. are covered up, I apply a lacquer film or coating, as by spraying, dipping or flowing of a resinous material, such as of polyethylene terephthalate which, as a film is highly durable, transparent and water-repellant, but preferably a material, such as nitroglycerine, which may constitute a part of the pay load of the propellant. This coating may be in the form of a relatively thin thickness, approaching about 90% of the total thickness of the composite coating to be applied.

In the next step, I place the shaped lacquer-coated body in a vacuum chamber, vaporize the metal which is to be applied as a coating, and then apply it as a substantially continuous metal coating to the lacquered surfaces that are to be controlled to provide a composite coating for the propellant body. The application is effected in the form of vaporized metal particles to the lacquer film or coating; they are deposited thereon as a relatively microscopic film, for example, of 2 to 3 millionths of an inch in thickness. This is done in such a manner that the metal coating is closely adherent to the lacquer coating which is, in turn, securely adherent to the propellant body.

If it is desired to strengthen the propellant body shape or to make it fully self-supporting as to its shape, I then apply a second metal coating directly to the first metal coating to build it up to a desired thickness of for example, up to about .030 of an inch for the composite. It should be noted that the first metal coating, as applied, is bright or reflective on both its inner and outer surfaces. As to its inner surface, this desired result is furthered by the lacquer or resin coating. The first metal coating is of relatively thin thickness and has to be applied in such a manner as to retain the surface of the propellant body relatively cool and avoid burning or vaporizing it. I have determined that the second metal coating may be applied in a more economical manner, since the first coating acts as a heat barrier as to the body of the material along with the first coating of lacquer, such that the second metal coating may be applied by spraying, electroplating, etc. where higher temperatures may be involved that are better suited for a thicker application. The second metal coating applied to the first coating approaches a coherency with it, in adhering thereto, and permits a building-up of a metal thickness that may be uneconomical from the standpoint of the first type of coating application. It will be noted that an electroplated coating of up to about .0005 to .00010 of an inch and a metallizing spray coating of up to about .0050 of an inch are economical.

If a second metal coating is not needed for increasing the inhibiting effect, and primarily for increasing the structural strength of the body, I contemplate the application of a second lacquer or resin coating or film which may be of the same type as the first coating and which is applied, as by spraying, dipping or flowing the material in liquid form over the coated metal surface. A second lacquer coating is advantageous from the standpoint that it protects the brightness of or prevents tarnishing of the surface of the first metal coating, protects it from damage, and makes the propellant body or shape easier to handle. Although a second lacquer coating is contemplated as to a second metal coating, I have found that in most cases it is not needed.

There are two important features of my invention which, in accordance with the conception, make practical the utilization and employment of a metal coating for a propellant body. The first is the use of a lacquer or resin film for preventing deterioration of surface portions of faces of the body, including the surfaces which are to be metal coated. The second involves an application of metal in such a manner that surface portions of the propellant body over which it is applied are maintained relatively cool and below a temperature of about 200° F. The lacquer coating also is employed to smooth off surface irregularities of the propellant body and assure a bright inner surface of the metal coating which firmly adheres thereto and has a relatively smooth engagement therewith.

As previously intimated, difficulty has been heretofore encountered in controlling the burning of a propellant body, since such control has been dependent upon the shape or size of the bore, cavity or inner surface of its shape and further, and since there is a tendency for the shape to collapse into the cavity. This may occur before the propellant shape is inserted in the rocket motor or after it is inserted in the motor. To alleviate collapse after insertion, those skilled in the art have heretofore applied cement to the inside of the rocket wall, in order to glue the taped propellant shape thereto and hold it in position. In accordance with my invention, this difficulty has been eliminated and, in addition, the propellant charge may be made up of sectioned or individual pieces, each of which has a coating and thickness of a desired type for proper control of the burning action.

By employing a propellant charge made up of coated units, such as front end transverse cone segments and cylindrical transverse body segments or discs, placed in an assembled position within a rocket motor, I can provide each unit or segment with a metal coating of a desired thickness or type for individually controlling the burning action in a selective manner. For example, the last or bottom segment, which is located adjacent the gas flow passageway of the rocket motor, may be given a reinforced metal thickness to protect it along its outer walls against the normal blow-out of gases. It is also possible to use rod members of propellant material which are assembled longitudinally of the rocket motor and each of which has a metal-coated or enclosing surface. As a result, a desired thickness or size and shape of selected portions of a propellant charge may be employed. I thus make possible a flexibility of utilization of a propellant charge and enable a better control or moderation of the burning of the explosive material.

FIGURE 1 is illustrative of a cast, double base, solid fuel, propellant article, charge or product 10 coated and constructed in accordance with my invention. The article 10 is shown provided with a coating $c$ about its cylindrical wall and with suitable cavitation extending through its body along its axis and open to its end, as represented by bore cavity $a$. In FIGURE 2, the article 10 is shown in a mounted, ready-for-firing position within a conventional rocket motor 15.

In FIGURE 1A, I have shown a propellant charge of a previously discussed type that is made up of body segments, such as 10', 10", etc., that may be employed to give a further control of burning action. The coating $c$ is shown extending about the cylindrical wall as well as the back end of each segment 10', 10", etc.

In FIGURE 3, 10 represents the composite article whose shaped explosive body has an outer surface $10d$ provided with an inner lacquer film or coating 11 of resinous material. This coating is preferably, as before pointed out, of a material, such as nitrocellulose, which will constitute a part of the payload of the propellant charge. A vacuum-evaporated-on metal coating 12 is shown positioned in a closely adhering relation on the coating 11; the coating 12 is highly reflective on both its inner and outer surfaces and constitutes a relatively thin metallic film. Also, by way of illustration, I have shown an outer or second metal coating 13 which may be applied by spraying, electroplating, etc., and which provides a build-up of metal thickness from the standpoint of the coating 12.

Figure 4:
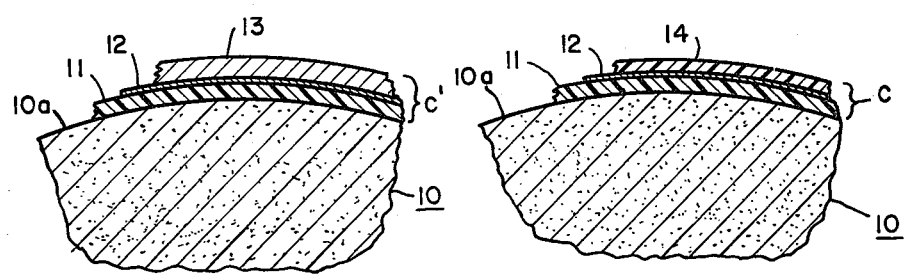
FIGURE 4 is a view on the same scale as and similar to FIGURE 3 illustrating another embodiment thereof.

In FIGURE 4, I have shown the inner resin coating 11 and the vaporized metal coating 12 and, in place of the outer metal coating 13, have shown an adherently-positioned second lacquer or resin coating 14 which may be employed to protect the brightness of the outer face of the metal coating 12 and also to protect it from damage. As previously mentioned, although a second lacquer or resin coating may be applied to the outer metal coating 13, I have found that in most cases it is not needed. When the inner resin coating 11 is of an oxidizable or readily burning type of material, such as nitrocellulose, it, in effect, constitutes a smooth surface portion of the shaped explosive body; it facilitates the provision of the thin metal coating 12 that controls the burning of the explosive body.

What I claim is:

1. In a solid fuel propellant article suitable for rocket motors, a body of shaped explosive material of somewhat plastic nature, a relatively thin solidified coating of vacuum-evaporated metal in a closely adhering relation along exposed surface portions of and providing a surface binding on said body to retain its shape during handling, and said metal coating being heat conductive and having highly reflective substantially pure metal surfaces to at least initially control burning of said body when it is used as an explosive.

2. In a solid fuel propellant article suitable for use in rocket motors, a body of shaped explosive material of somewhat plastic nature, a relatively thin solidified coating of vacuum-evaporated metal in a closely adherent relation along exposed surface portions of and providing a substantially continuous surface binding about said body, said metal coating being heat conductive and having highly reflective surfaces to at least initially inhibit burning of said body, said coating sealing-off said body from vapor and fume moisture, and said metal coating being of a type that will easily burn during the final burning action of the explosive material.

3. In a solid fuel propellant article suitable for use as an explosive in rocket motors, a body of shaped explosive material of somewhat plastic nature that is sensitive to burning at a temperature of above about 200° to 280° F., a relatively thin solidified coating of vacuum-evaporated metal whose particles are strongly molecularly bonded to each other and in a securely adherent relation along exposed surface portions of said body, said metal coating having a thickness of about 2 to 3 millionths of an inch and being heat conductive and bright and highly reflective on both its inner and outer surfaces to control burning of said body by reflecting heat at least initially from the surface portions thereof, and said metal coating being applied to the exposed surface portions of said body without heating them to a temperature above about 200° to 280° F.

4. In a solid fuel propellant article suitable for rocket motors, a body of shaped explosive material of somewhat plastic nature that is sensitive to temperatures above about 200° to 280° F., a relatively thin resinous coating in a securely adherent relation along exposed surface portions of said body to prevent exudation of said body, a relatively thin solidified coating of vacuum-evaporated metal in a securely adherent relation along exposed surface portions of the resin coating and having its metal particles strongly molecularly bonded to each other to provide a substantially continuous surface binding about said body, and said metal coating having heat conductive and highly reflective substantially pure metal surfaces to control the initial burning of said body when it is being exploded.

5. A propellant article as defined in claim 4 wherein the resinous coating has a thickness of about .0005 of an inch.

6. A propellant article as defined in claim 4 wherein an outer relatively thin solidified resinous coating is in a securely adherent and protective relation about the solidified metal coating.

7. A propellant article as defined in claim 4 wherein a second reinforcing metal coating is in a securely adherent relation about the first-mentioned solidified metal coating.

8. An article as defined in claim 4 wherein the metal of the coating is of a class consisting of aluminum, silver, gold, chromium, iron, nickel and their alloys.

9. In a solid fuel propellant article suitable for rocket motors, a body of shaped explosive material of somewhat plastic nature, a relatively thin resinous film coating in a securely adherent relationship along exposed surface portions of said body, a relatively thin solidified vacuum-evaporated metal coating in a securely adherent relation along exposed surface portions of the resinous coating and having its particles in a molecularly bonded relation with each other, said metal coating being heat conductive and having bright and highly reflective surfaces to at least initially control the burning of said body when it is exploded, said metal coating being of a type that will easily burn during the final burning action of the body of explosive material, a second relatively thin resinous coating in a securely adherent relation along exposed surface portions of said metal coating to protect its outer reflective surface, and the composite coating having a thickness of about .0005 to .030 of an inch, said metal coating comprising about 10 percent of the total thickness of the composite coating, the first resinous coating comprises about 54 percent of the total thickness of the composite coating, and the second resinous coating comprising about 36 percent of the total thickness of the composite coating.

References Cited in the file of this patent

UNITED STATES PATENTS

| | | |
|---|---|---|
| 540,327 | Maxim | June 4, 1895 |
| 1,036,176 | Bichel | Aug. 20, 1912 |
| 2,643,184 | Cairns | June 23, 1953 |
| 2,767,105 | Fletcher | Oct. 16, 1956 |
| 2,959,001 | Porter | Nov. 8, 1960 |

OTHER REFERENCES

Article by J. M. Vogel in "Jet Propulsion" magazine, published February, 1956, pages 102–105. (Copy available in Scientific Library and in Div. 10, 102–98.)